INVENTORS
Henry R. Greenley, &
BY William E. Craig

ATTORNEY

INVENTORS
Henry R. Greenley, &
BY William E. Craig

ATTORNEY

INVENTORS
Henry R. Greenley, &
William E. Craig
BY
Ralph L. Twedale
ATTORNEY

United States Patent Office 3,706,072
Patented Dec. 12, 1972

3,706,072
DIGITAL COMMAND CONTROL SEQUENCER
AND MACHINE CONTROLLED THEREBY
Henry R. Greenley, Bloomfield Hills, and William E.
Craig, Wyoming, Mich.; said Greenley assignor to C. O.
Porter Machinery Company, said Craig assignor to
Computer Specialties Corporation, both of Grand
Rapids, Mich.
Filed Jan. 21, 1970, Ser. No. 4,629
Int. Cl. H04g 1/00
U.S. Cl. 340—147 P
8 Claims

ABSTRACT OF THE DISCLOSURE

A panel saw for cutting panels into smaller pieces has a first carriage for moving the panels in steps in one direction to be sawed in a direction at right angles thereto and a second carriage for moving the sawed pieces in steps in the second direction to be sawed in the first direction into still smaller pieces and is controlled by a digital command sequencer including memory and logic units through which a desired sequence of feed movements and sawing actions may be commanded automatically in accordance with a program introduced manually or from an external source directly into the memory of the sequencer. Selector means enable the sequencer to be operated in several modes for either inserting data to produce a particular program, or for utilizing an inserted program to carry out a particular sequence of cuts on panels introduced into the machine. A manual keyboard and digital display panels allow the operator to generate dimensional data and to insert it into the controller's memory directly for subsequent utilization to command a sequence of sawing and feeding operations in accordance with the particular program selected.

---

The automatic control of machine tools through the use of computers either of the numerical control type or of the analog control type has heretofore required the use of recording media such as magnetic or perforated paper tapes upon which programs of machine operations are set up and utilized to cause the machine to go through a particular sequence of motions and operations. Such computerized machine tool controls have achieved high degrees of accuracy and versatility. They require, however, expensive programing procedures carried out by specially trained personnel in order to achieve the automatic accomplishment of the particular sequence of operations required to produce a given finished work piece.

It is an object of the present invention to provide a digital command sequencer for a machine tool which can be programed for any one of a number of machining sequences from point to point by operation of a manual data generating keyboard without necessitating the recording of data on tapes or other physical recording media.

It is also an object to provide a machine tool in this class wherein a number of programs thus inserted into the memory of the sequencer may be used repeatedly and selectively to cause the machine tool to produce work pieces in accordance with the selected program.

A further object is to provide such a machine tool which is compatible with external computer and controller devices which do utilize programs recorded upon cards, tapes, or other tangible media.

The invention consists of a machine tool having carriages movable along x and y axes, servomotors for driving the carriages, feed-back transducers for signaling the travel distance of the carriages and a digital command sequencer having a core memory for receiving, storing and transmitting data corresponding to a sequence of travel increments of the carriages, data generating means selectively connectable with the memory for inserting data therein in individual blocks, and logic units connecting the data generating means with the memory to control the insertion of data into the memory and to control the utilization of data stored in the memory to produce a sequence of carriage movements corresponding to the data blocks previously produced by the data generating means.

Figure 4:
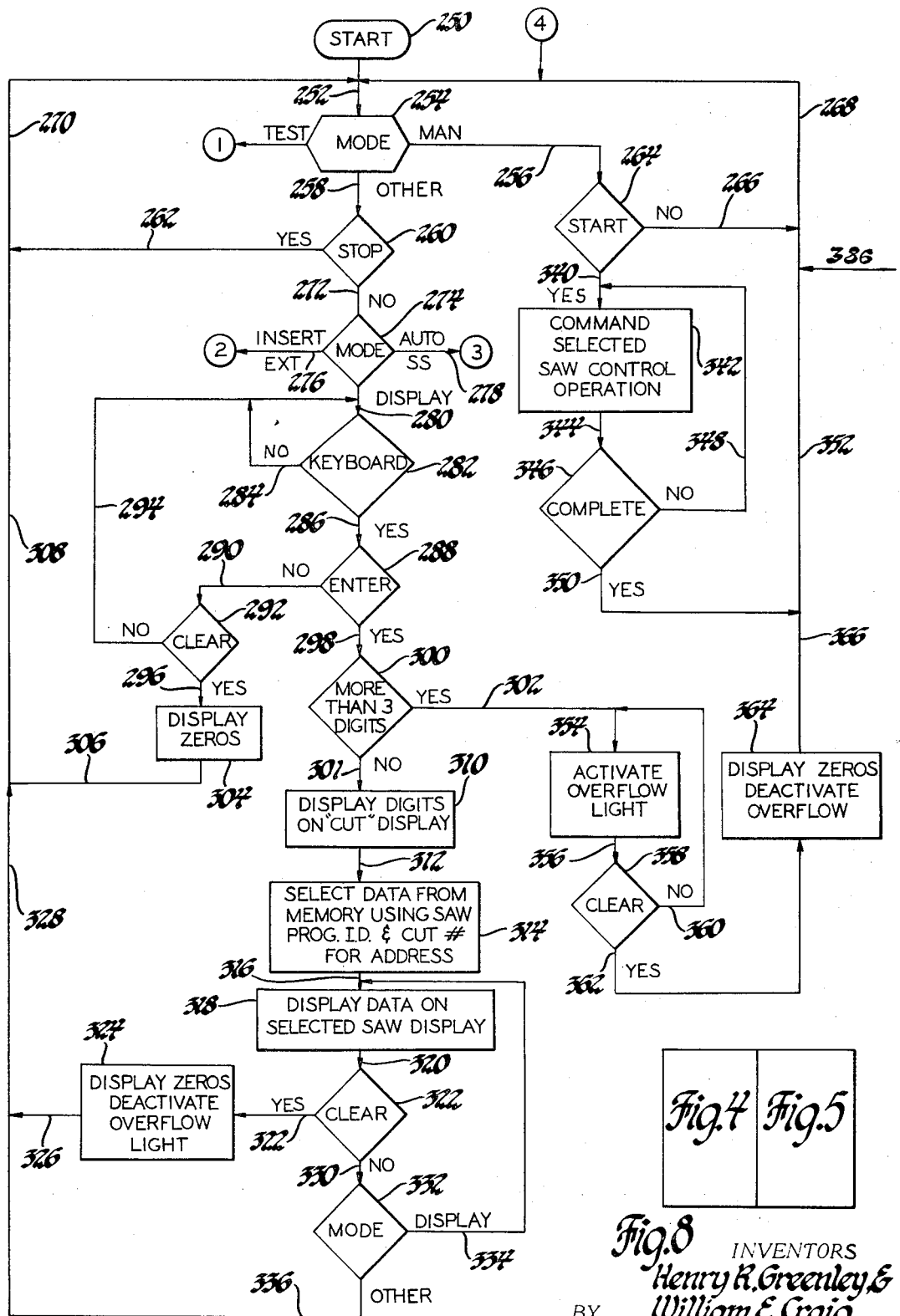
Figure 5:
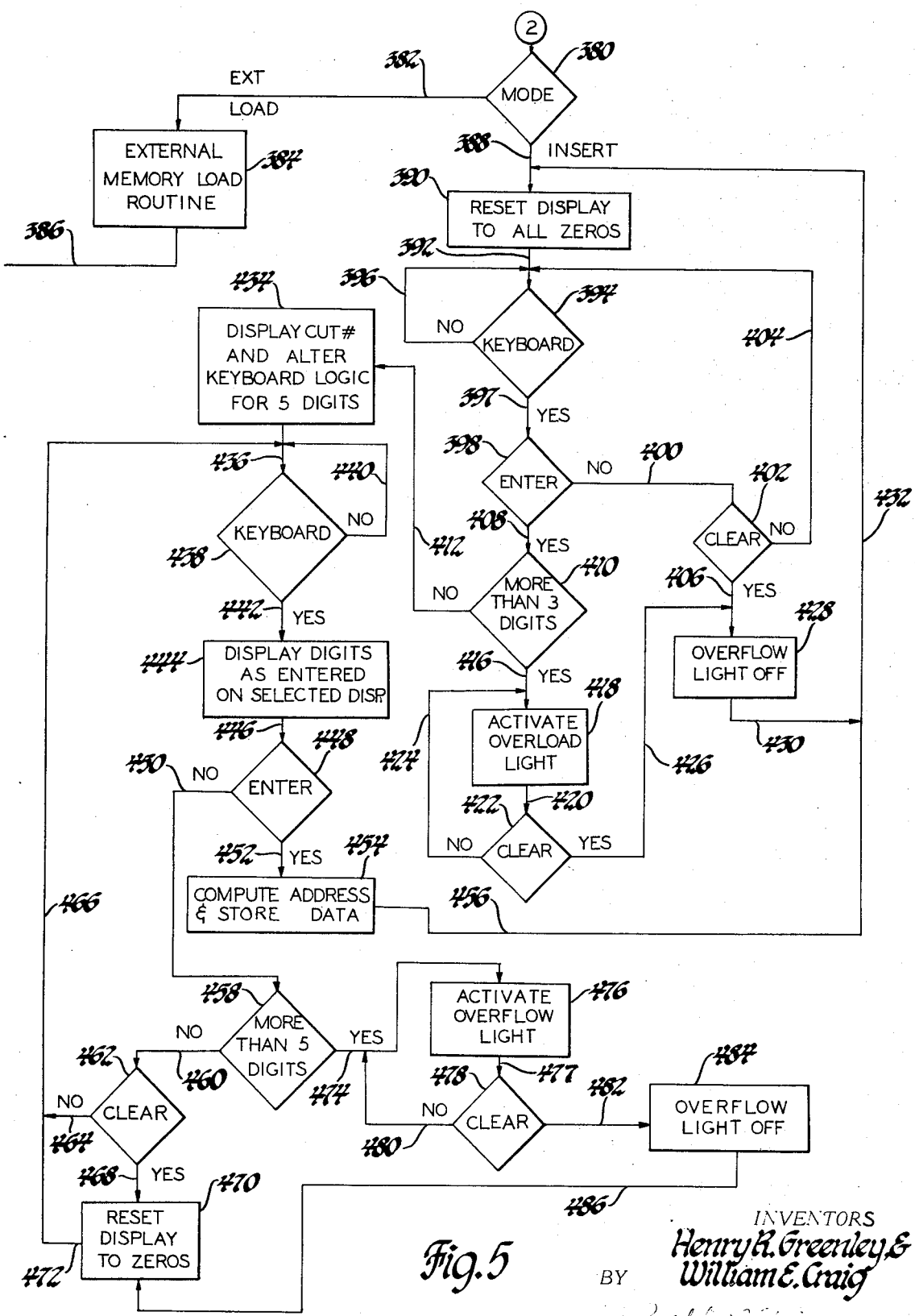
Figures 6, 9:
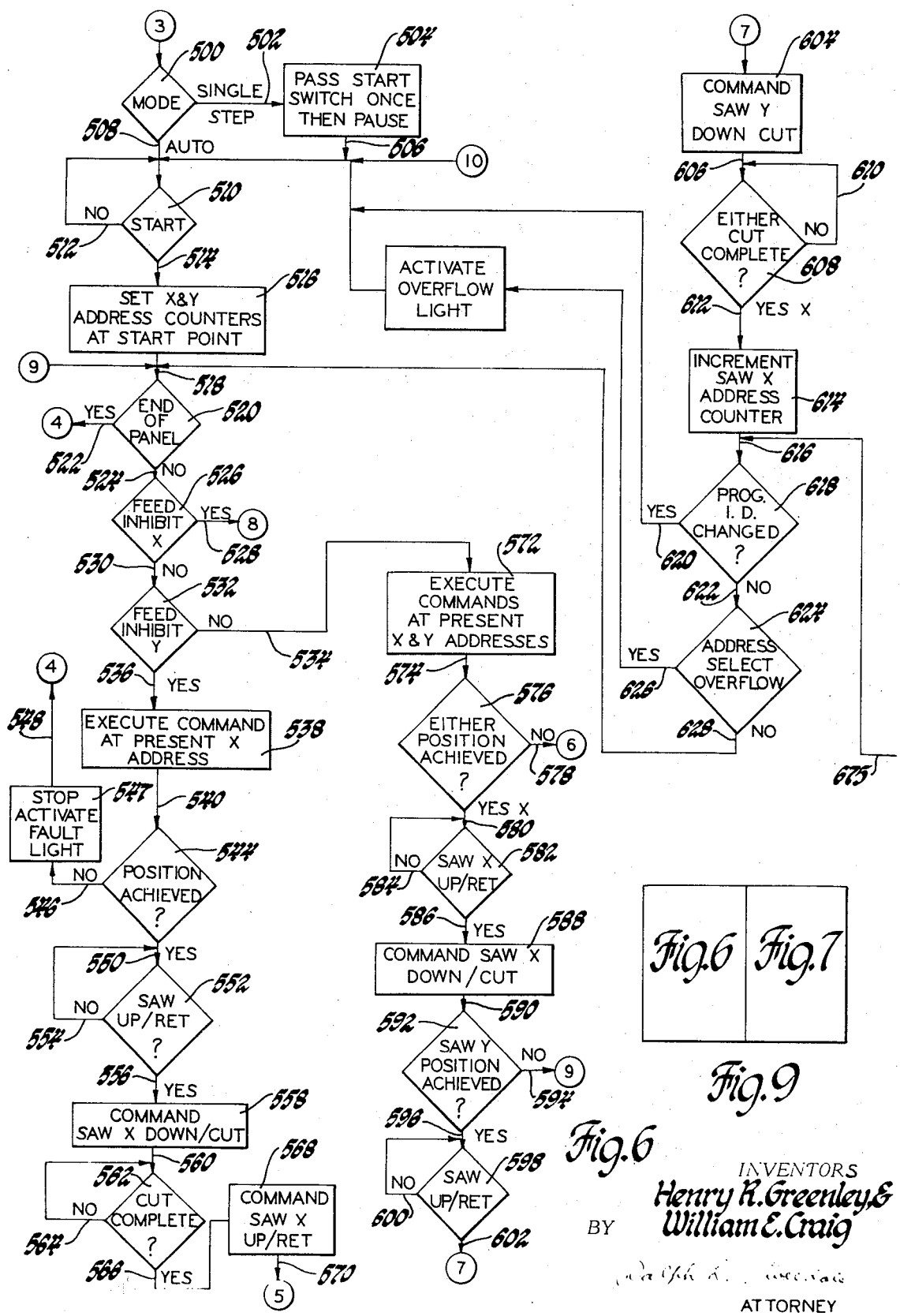
Figure 7:
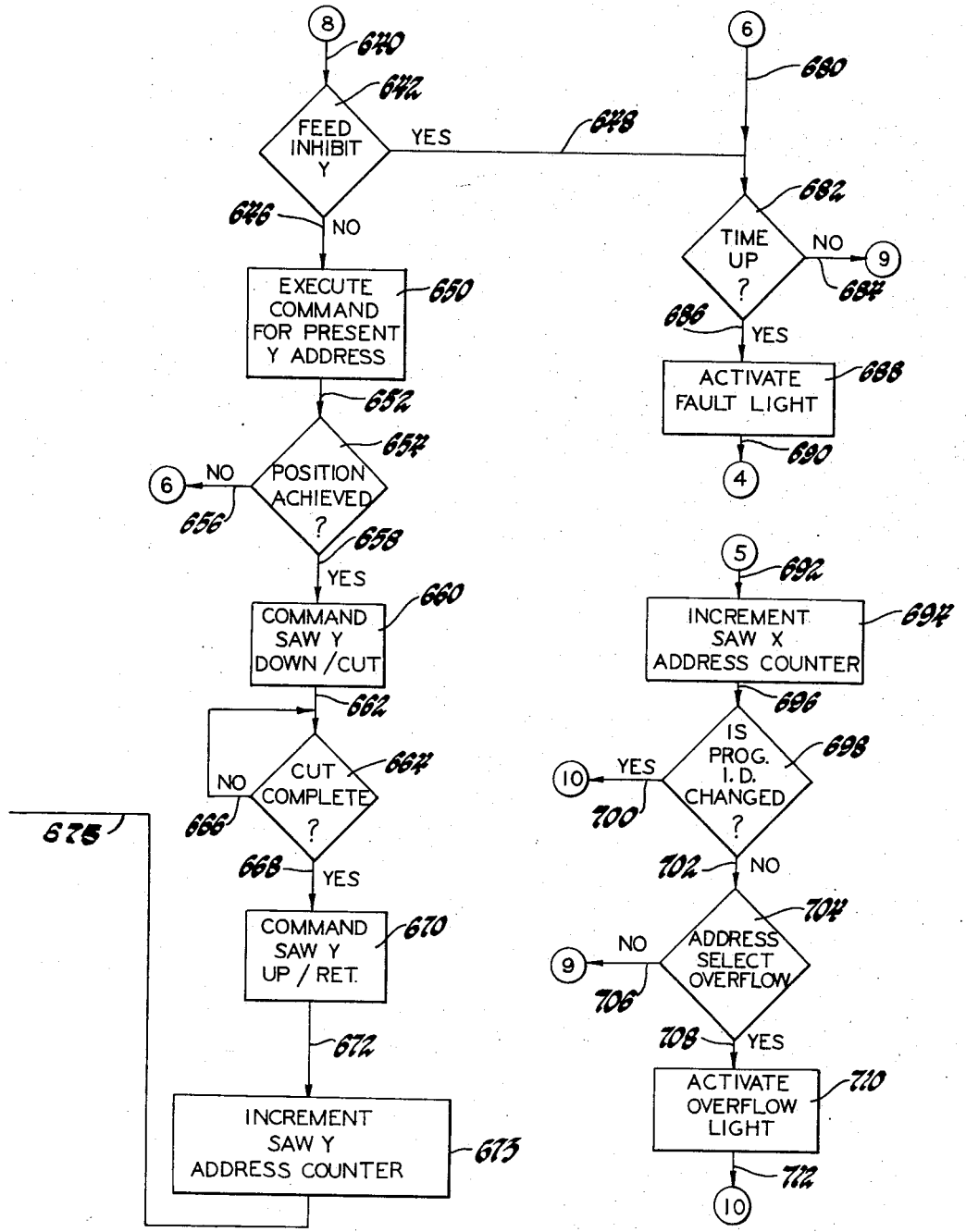

FIGS. 4, 5, 6 and 7 are logic flow diagrams, FIGS. 4 and 5 being associated as illustrated in FIG. 8, and FIGS. 6 and 7 being associated as illustrated in FIG. 9.

Figure 1:
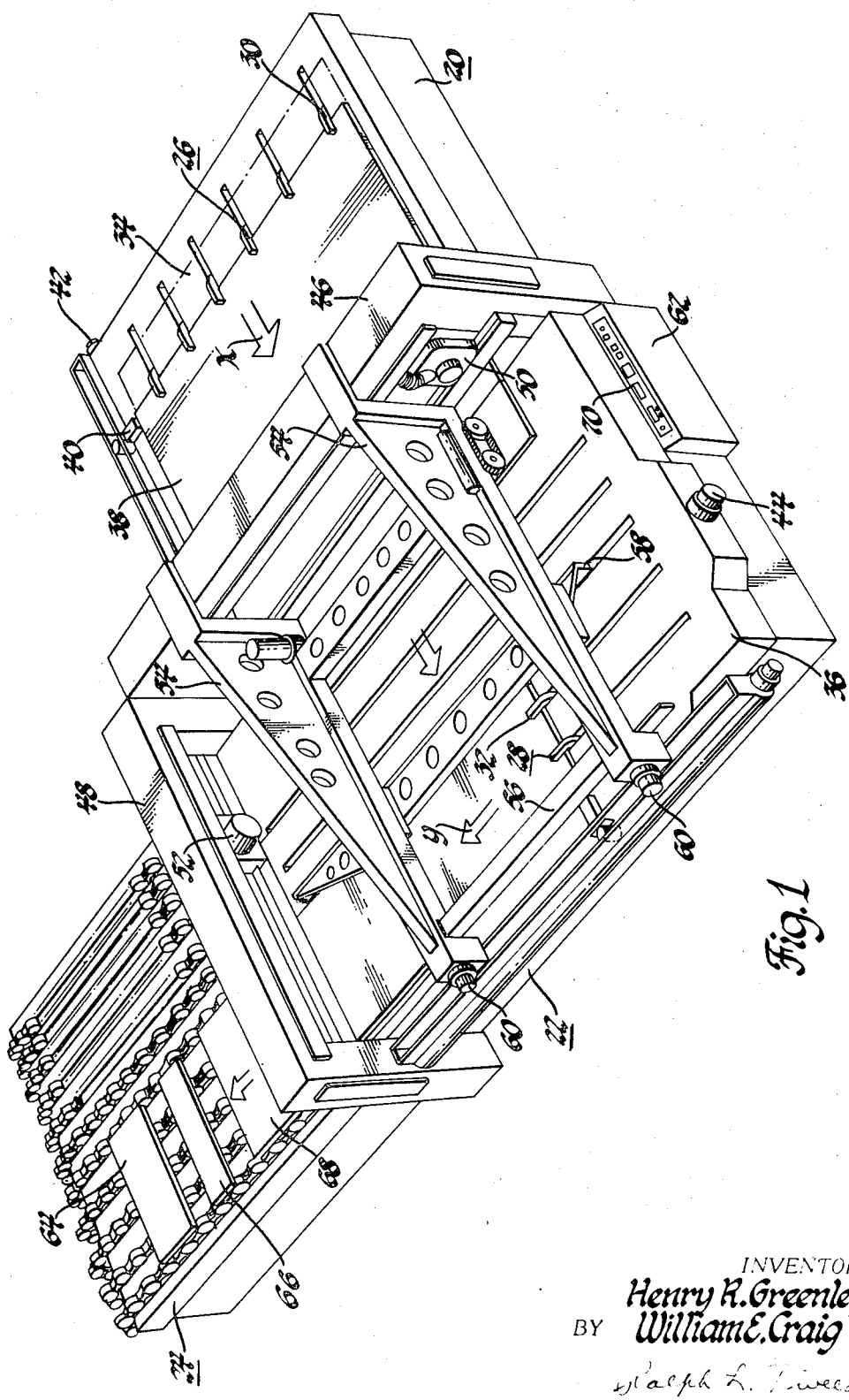
FIG. 1 is a perspective view of a panel saw incorporating a preferred form of the present invention.

Referring now to FIG. 1, there is illustrated a compound panel saw which is basically two panel saws 20 and 22 together with a run-out table 24. Each saw has a feed carriage 26 and 28 composed of a plurality of work gripping pushers 30 and 32 which move progressively along channels in the flat platens 34 and 36. Feed carriage 20 is arranged to receive panels such as 38 which are positioned, manually or otherwise, against a locating stop 40 prior to being automatically fed in the direction of the arrow x. A drive for the feed carriage 26 is provided in the form of a rotary electric servomotor indicated at 42. A similar drive for the feed carriage 28 is indicated at 44. Both servomotors include pulse tachometers for feed-back purposes later to be set forth.

Each panel saw has a gantry structure 46 and 48 along which saws 50 and 52 may be propelled to make cuts in the panels perpendicular to their respective directions of feed. The saws 50 and 52 are also arranged for short vertical travel so as to move into and out of cutting relationship to the plane of their respective platens. Suitable electropneumatic controls of well-known form, not shown, are provided for effecting these operations and include limit switches responsive to the arrival of the saws at the beginning and ending points of their motions.

Attached to the gantry 46 by means of outrigger arms 54 is an automatic work locater for the feed carriage 28. This comprises a stationary fence 56 and a traveling fence 58 which slides along the bottom of the outriggers 54. It carries suitable pivoted dogs, not shown, allowing it to pass over a work piece on its retraction stroke and to propel the same on its forward stroke. Electric servomotors 60 for actuating the movable fence 58 are arranged for automatic actuation in response to the saw 50 having completed a cutting cycle. Servomotors 60 reverse in response to torque or current build-up when the work piece abuts the stationary fence 56 and the servomotors 60 stall.

An electric control console 62 is provided at a convenient location. The console 62 contains a digital command sequencing controller, the function of which is to command the operation of the feed carriages 26 and 28 and the saws 50 and 52 in accordance with any one of a number of pre-selected assortment of smaller panels such as indicated at 64, 66 and 68.

Figure 2:
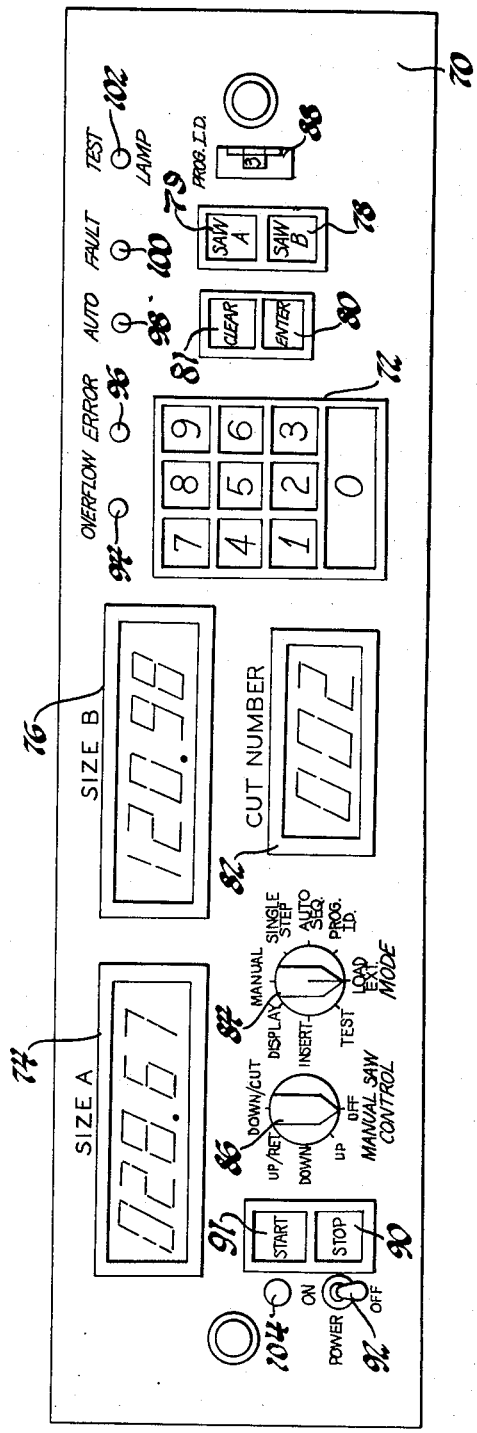
FIG. 2 is an elevational view of a control panel forming part of the present invention.

Referring now to FIG. 2, the control panel of the controller is indicated generally at 70 and is arranged to provide an interface with an operator for selecting various modes of control of the panel saw as well as for entering data into the memory of the controller to produce and store programs of cutting operations, for calling such programs into action, and for monitoring the progress of the programs as they are being performed.

A keyboard 72 is provided, of well-known form, such as used in electronic calculators. This keyboard is used to enter each desired dimensional value, preferably stated in hundredths of an inch, through which it is desired to have the feed carriage for one of the saws travel at one step. It is also used to designate the cut number in a cycle of cuts to which the dimensional data pertains. Numerical display panels 74 and 76 are connected to be actuated by the keyboard, indicating the number which has been entered. They may also be actuated either by the memory circuits of the controller as will later be described, or by the feed-back pulse tachometers at the servomotors 42 and 52. An illuminated indicating selector switch 78 is provided for determining which saw is to receive a program entry. This switch is alternately operated and also connected with the memory circuits for indicating the function of the selected saw. A dual pushbutton switch 80 enables the operator to either clear the digits which are indicated on the display or to insert into the memory the digital dimension indicated on the display.

For the purpose of identifying the step in the program which is to receive a dimensional entry or from which an entry is to be retrieved, a digital display panel 82 is provided and may be operated by the keyboard to select the cut number (first, second, third and so forth), preceding which a desired dimension of feed travel can be inserted in the memory.

A mode selector switch is indicated at 84 by which the operator may select any one of a number of modes of operation such as are indicated in FIG. 2. A rotary selector switch 86 is connected to control either of the saws manually, and a thumbwheel switch 88 is provided to select a desired program from the various ones previously stored in the memory of the controller. Start-stop and power switches 90 and 92 together with suitable warning lights 94, 96, 98, 100, 102 and 104 are also provided on the panel.

Figure 3:
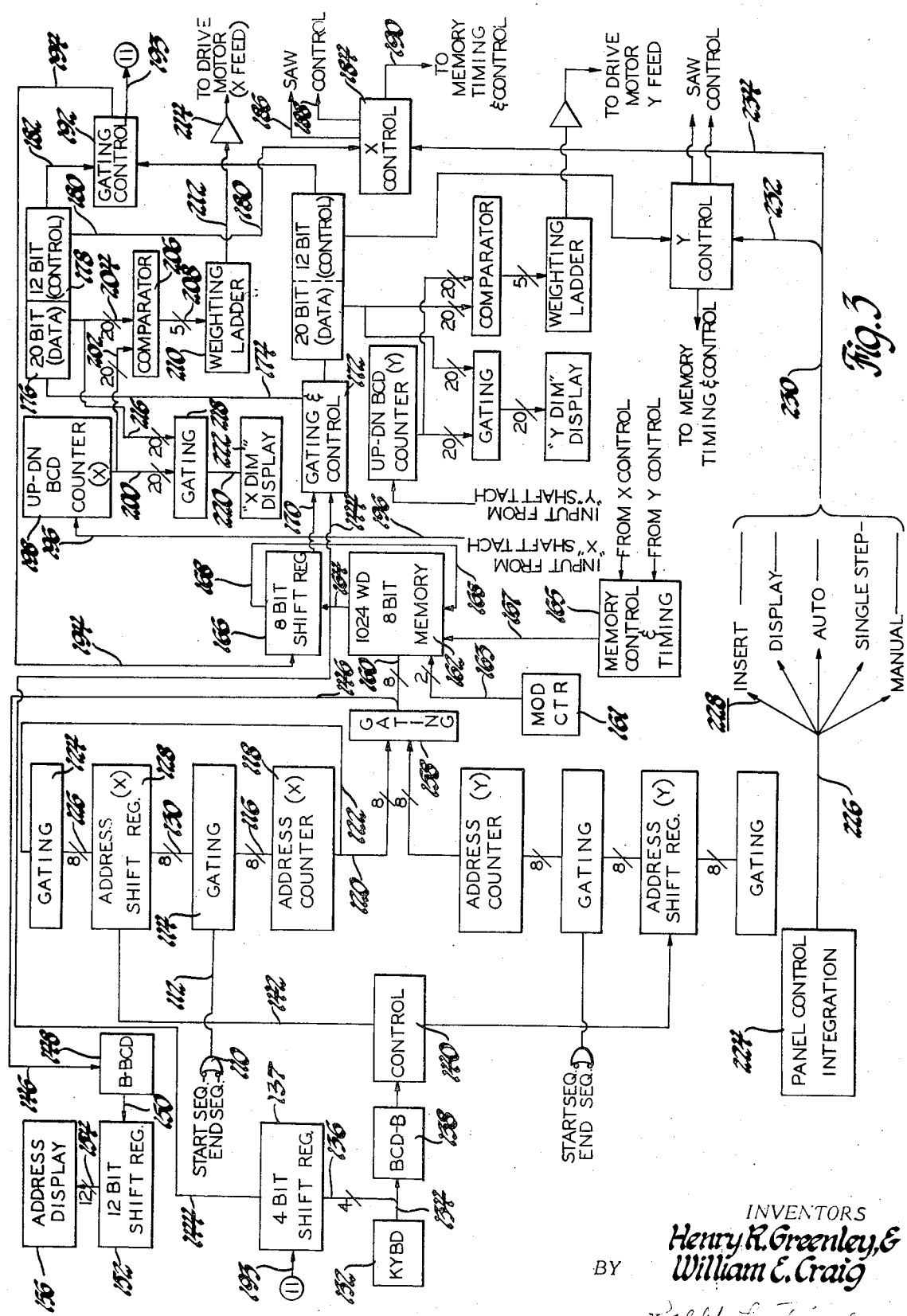
FIG. 3 is a block diagram of the control circuitry forming part of the present invention.

Referring now to FIG. 3 wherein the various components of the digital command sequencer and their effective relationships are diagramed, block 224 represents the panel control integration which, as indicated by line 226, enables the operator to control the various modes indicated generally at 228, in which the sequencer may be manually selected to operate. Thus, in the insert mode dimensional data produced by operating the keyboard is directed to the appropriate address in the memory. In the display mode, data may be retrieved from a specified address of memory for display on the panel 70. In the automatic sequence mode, the feed carriages and the saws are actuated automatically in accordance with a pre-selected program. In the single step mode, actuation of the start switch permits the functional steps of a program to be performed one at a time. In the manual mode, the digital command sequencer is inhibited and control is passed to the manual saw control switch 86. Each of these modes, when selected, operate as indicated by lines 230, 232 and 234 to effect the y axis control and the x axis control, respectively. Thus, for example, considering the controls on the x axis, block 184 represents the controls accomplished through line 234 to effect (a) the control of the saw 50 through lines 186 and 188; and (b) the control of the feed carriage 26 for the x axis through the line 190 to the memory timing and control section of the digital command sequencer.

Considering now the components of the sequencer, the keyboard is indicated at block 132 at the left of FIG. 3. This exercises control over the binary coded decimal to binary conversion network 138, the output of which goes to the control unit 140 which is connected by line 142 with the address shift register 128 for the x axis. Control section 140 has similar connections for the y axis illustrated in the lower part of FIG. 3 and the following description of the x axis components will be seen to apply by analogy to the y axis also.

The keyboard 132 also controls through connection 136 a four bit shift register 137 from whence the keyed data enters through line 144 the gating and control section 172. From this section a connection 174 feeds data to the 20 bit data register 176. The 12 bit control register 178 also receives data through line 174 and transmits it through line 182 to gating and control section 192 and through line 193 and points 11 back to close the loop on the four bit shift register 137. By this arrangement, each time a key is operated, the information is shifted or skewed four bits, thus filling the registers 176 and 178 in four bit steps. This information, as it accumulates in register 176, is transmitted by a line 216 gating 218 and line 220 to the x dimension display 222 which controls the visual display unit 74 in the panel 70.

If the information displayed is proper, after five key operations or less, the operator may then decide to enter this data into the memory. This is done through the panel control and integration unit 224 and specifically by operating the enter switch 80 on the panel 70. For this purpose, a line 182 connects with gating and control network 192 which is connected by a line 194 with the eight bit shift register 166. In the event that the displayed data is not what is desired, the operator may utilize the clear switch 81 which wipes the data from the register 176.

The 1024 word, eight bit core memory 162 is connected by a line 163 with the mod counter 161 which controls the address section of the memory. The core memory 162 is capable of storing a plurality of programs each of which is selectable by means of a control 88 shown in FIG. 2, and each of which comprises a plurality of individual control commands for operating the saws. The address shift register 128 which receives keyboard data from control 140 is connected by a line 130 with the gating network 114 and through line 116 and address counter 118 and line 120 to the gating section 158, which is connected by a line 160 with the memory 162. A loop 122 connects through gating 124 and line 126 with the address shift register 128. Gating 114 is under the control of the start sequence-end sequence logic unit 110 through line 112. A line 146 connects through the binary to binary coded decimal converter 148 and line 150 to the twelve bit shift register 152. This, in turn, is connected through line 154 with the address display 156 which controls the display panel 82 showing the cut number which is currently in process.

The memory control and timing section 165 receives impulses from the x control or the y control as sawing operations progress from one step to the next, and through line 167 controls the memory 162. A line 196 which is connected with the servomotor pulse tachometer of the x feed carriage controls an up-down binary coded decimal counter 198 for the x axis and this in turn is connected by a line 200 with the gating 218 and by line 220 with the x dimension display 222. This then enables the exact position of the x carriage to be continuously displayed.

This operation occurs whenever the selector 228 is in the automatic or the single step mode as determined by the manual selector switch 84 on the panel and by the actuation of the start switch 91 which is a part of the panel control integration 224. This control is effected through the x control block 184 which through line 190 connects with the memory control and timing network 165 which in turn controls the memory through line 167.

From the twenty bit data register 176, a line 204 connects with a comparator 206 which is also connected by a line 202 with the up-down counter 198 for the purpose of comparing the instantaneous position of the carriage with the desired final position as represented by the memory data in register 176. The output of the comparator 206 is used to control the drive motor 42 for the x axis feed carriage. This it does through a line 208 leading to a weighting ladder 210 and through line 212 and amplifier 214 to the drive motor 42. The weighting ladder is responsive to the magnitude of the difference output of the comparator 206. As this difference becomes smaller toward the end of the feed step, the weighting ladder will control the amplifier 214 to decelerate the drive motor and bring the feed carriage to a stop at the point of zero difference output of the comparator 206. In the event of overshooting, the comparator difference will become negative and through the weighting ladder will reverse the motor to restore it to the desired data position.

Upon reaching this point, the $x$ control 184 initiates operation of the saw through the control line 186. This causes the saw 50 to descend, traverse across the panel, withdraw upwardly and return to the starting position in accordance with the usual limit stop and sequence type of controls inherent in the saw itself.

The $x$ control network 184 also receives directions from the twelve bit control register 178 through line 180 for the purpose of sensing the completion of a single step in the cycle and utilizes this information through the memory timing and control unit 165 to prepare for the next reading of the memory 162.

Referring now to FIG. 4 where the logic flow is diagramed, the program for an automatic sequence of operations begins at the start block 250 by initiation of the start switch 90 on the control panel 70. The program proceeds via line 252 to the mode block 254 where a test is made showing whether the selector switch 84 on the panel is set to (a) test or to (b) manual or to (c) any of the other five available settings. If it is set for test, as indicated at 1, all further selections are suspended and any desired test operations not forming part of the present invention may be performed. If set for manual, the logic proceeds via line 256 to the start block 264 and to further logic to be described later.

If the test at block 254 indicates any of the other settings, the logic proceeds via line 258 to the block 260 where a test is made to determine whether the program stop switch 90 is activated. If the test indicates yes, the program proceeds via lines 262, 270 and 252 back to the mode block 254 so that the program is completely halted. As soon as the stop switch 90 is deactivated, the logic proceeds via line 272 to a further test on the mode switch as indicated at block 274. This test determines whether the mode selector switch 84 is in either (a) the insert or external load position, or (b) the automatic or single step position or (c) the display position.

Considering the display position first, the logic proceeds down line 280 to the block 282 which tests for keyboard entry. If there has been no keyboard entry, the program is placed in a wait loop via the line 284 back to line 280. When data has been entered via the keyboard the program proceeds through line 286 and waits for activation of the enter switch 80 at block 288. If the enter switch 80 has not been activated, the program proceeds via line 290 to the clear test block 292. If the test at this block is negative, the logic proceeds via line 294 to line 280 and a further test at the keyboard block 282. If the test at 292 is positive, the program proceeds via line 296 to activate the block 304 which initiates restoring the displays to zero and closes the loop via line 306, 308 and 270 to the beginning of the program at line 252.

Reverting to the enter test block 288, if the result is positive, the program proceeds via line 298 to the test block 300 which is to determine whether more than three digits have been designated at the keyboard 72. If there are more than three digits designated at the keyboard, the logic proceeds via line 302 to the block 354 for the purpose of actuating the overflow light 94 indicating that an error has been made. This indicates that the operator has attempted to select a higher address number than is available in the memory. This will require actuation by the operator of the clear switch 80. The program accordingly proceeds via line 356 to the block 358 to await the activation of the clear switch. So long as the test is negative, the loop is closed via line 360. When the clear switch has been activated, the logic proceeds through line 362 to the block 364 for the purpose of displaying all zeros and deactivating the overflow light. Also, the program then proceeds via lines 366, 352 and 268 to the start line 252.

Proceeding again from block 300, if the test indicates that no more than three digits have been designated on the keyboard, the logic proceeds through line 301 to block 310 for the purpose of displaying on the cut number display 82 the digits which have been designated as a memory address to be read. Additionally, via line 312 there is initiated a selection of data at this address in the memory. This is coordinated with the program identification which has been indicated at the manual switch 88 so that the data for the particular cut number on the particular program selected will be made available at the memory. A further selection of the address to be reached will depend upon whether saw A or saw B has been designated at the switch 79 or 78, respectively.

The logic, proceeding via line 316 to block 318, will then transfer the data at this memory address to the appropriate one of the two displays 74 or 76. The logic proceeds via line 320 to the test block 322 to check the condition of the clear switch 81 and if a positive indication results, the logic proceeds via line 322 to block 324 to cause the display of zeros and deactivate the overflow light if it has been on, and to proceed via lines 326, 328, 308 and 270 to the start line 252. Returning to block 322, if the test is negative, the logic proceeds via line 330 to the test block 332 to determine whether the mode switch is in display position or not. If this test indicates that the display mode has been selected at switch 84, the logic returns via line 334 to line 316 for refreshing the display of data as indicated by block 318. If the mode switch was not on display position, the logic proceeds back to the start via lines 336, 328, 308 and 270.

Reverting to the block 274, if this test indicates that either the insert mode or the external load mode have been selected, the logic proceeds to the point marked 2 and transfers over to the corresponding point indicated on FIG. 5 where a final test is made at the block 380 on the mode switch to indicate which of these two positions has been selected. If the external load position has been selected, block 384 indicates the routing whereby a separate program from any desired external source such as a higher rank computer may be fed into the memory 162 as indicated via line 386. If, on the other hand the insert mode has been selected, the logic proceeds via line 388 to block 390 where the first step of this mode, namely resetting the display to all zeros, is performed after which the logic proceeds via line 392 to block 394 where a test of the keyboard is made. If there is no information designated at the keyboard, the program is placed in a wait loop via the line 396.

As soon as data is designated at the keyboard, the program proceeds via line 397 to block 398 to test whether the enter switch 80 has been activated. So long as the result is negative, the logic proceeds via loop 400, clear test 402 and no line 404 to close the loop at line 392. If the clear switch has been activated, the yes line 406 directs the logic to block 428 for deactivating the overflow light and proceeds via line 430 to close the loop at lines 432 and 388. If, on the other hand the enter switch had been depressed, the logic proceeds from block 398 through yes line 408 to the test block 410 to determine whether more than three digits were entered. If this test is positive, the logic continues via line 416 to block 418 where the overflow light is activated and via line 420 to the clear test block 422. If this test is negative, the loop closes via line 424 to line 416 until the clear switch is depressed, when it proceeds via line 426 to line 406 for the logic steps previously described from this point.

Reverting to block 410, if no more than three digits have been designated at the keyboard, the program then branches via the no line 412 to the block 434 initiating the display of the three digits on the cut number display 82 and to alter the keyboard logic to accept five digits. It then proceeds via line 436 to the keyboard test block 438. If there is do data designated at the keyboard, the program waits via the no loop 440. When data has been entered at the keyboard to indicate the desired dimension at which the indicated cut number will occur, the program proceeds via yes line 442 to the block 444 causing display of the five digits or less entered on the selected size display 74 or 76.

The program then continues down line 446 to the test block 448 to check whether the enter switch has been activated. If the enter switch has been activated, the program continues through line 452 to block 454 for computing the proper memory address and storing data thereat. When this data storage has been completed, the program proceeds via line 456 to the beginning of the insert mode at line 388.

Reverting to the test block 448, if the enter switch had not been depressed, the logic proceeds via no line 450 to the block 458 to test whether more than five digits have been designated at the keyboard as a cut size. If this test is negative, the program proceeds via no line 460 to block 462 to check whether the clear switch has been activated. If this test is positive, the program proceeds via line 468 to block 470 for resetting the display to zero and the program proceeds via lines 472 and 466 to line 436 for again testing the keyboard for further data entry. If, on the other hand at block 462 the test was negative, the program proceeds directly via lines 464 and 466 to the same block 438.

Reverting to block 458, if more than five digits had been designated as a cut size, the program branches along line 474 to block 476 where the overflow light is activated indicating any error in data entry and proceeds on through line 477 to the block 478 awaiting actuation of the clear switch. Until the clear switch is activated, the loop is closed at the no line 480 holding the overflow light energized. When the clear switch is activated, the program proceeds via line 482 to block 484 for de-energizing the overflow light and via line 486 to block 470 to reset the display to zero, and the program proceeds via lines 472 and 466 to the line 436 for again testing the keyboard at block 438.

Referring back to the beginning of the program, at block 254 in FIG. 4, if the test there had indicated that the mode selector 84 was in the manual position, the logic proceeds down line 256 to the test block 264 for checking whether the start button has been activated or not. Until the start switch is activated, the logic is locked up via loop 266 and 268 to the line 252. When the start switch is activated, the program proceeds via line 340 to block 342. The program proceeds to execute the control operations of the saw selected by switch 78 or 79 which are determined by the position of the manual saw control selector switch 86. The logic proceeds via line 344 to block 346 for determining whether the operation has been completed. Until it has been completed, the loop is closed via line 348. As soon as completion of that particular operation has occurred, the logic returns via lines 350, 352 and 268 to the start line 252.

Taking the last alternative out of the test block 274, namely either the automatic or the single step modes, the program proceeds via line 278 to the point designated 3 at which reference is now made to FIG. 6. A block 500 represents the final mode test as to whether the selector 84 is set for single step operation or automatic sequence. If it is the latter, the program proceeds through line 508 to block 510 for a test of the start switch which loops on itself through line 512 if the result is negative. If the result is positive, the program proceeds through line 514 to block 516 where both the x and the y address counters are set at their starting points for the particular program which has been initiated by setting of the selector switch 88 for program identification.

The logic then proceeds through line 518 to the block 520 which tests for completion of the total travel of the feed carriage of the relevant saw which would indicate that the end of a work piece panel had been reached. A positive result at this point sends the program through line 522 and via point 4 back to the corresponding point at the top of FIG. 4 to line 268 and starting line 252. If the result of this test is negative, the program proceeds via line 524 to block 526 for the performance of a test as to whether there are any inhibitors effective on the x axis feed. These inhibitors are controlled from discrete limit switch controls on the motions of the saw carriage for the saw 50 of FIG. 1 so that no feed movements can be initiated until the saw 50 has returned to its at rest position. If the answer is negative, the program proceeds through line 530 to block 532 for a similar test of inhibitions on the y channel controlled by limit switches on the saw 52. If the test at this point is positive, the program proceeds through line 536 to the block 538 to initiate operation of the feed carriage on the x axis through the distance indicated by the operative data in the presently effective x address counter.

The program proceeds through line 540 to block 544 to await the achievement of the desired terminal position of the x feed carriage. If this has been achieved in the allotted time interval, the no line 546 serves to activate the fault light 100 on panel 70 and stops the automatic sequencing as indicated by block 547. Then the program returns to the start point through line 548 and point 4 as shown at the top of FIG. 4 and line 268 to start line 252. When the feed carriage reaches the position commanded by the sequencer, the program proceeds via the yes line 550 to the block 552 for a test as to whether the panel saw 50 is retracted and in its upper position. Until this has been achieved, the program waits at this point through the no loop 554. A positive response at this point advances the program through line 556 to block 558 for the execution of a command to saw 50 to proceed down and to take a cutting traverse on the panel work piece which the carriage has just positioned.

The program then proceeds through line 560 to the block 562 for testing whether the cut has been completed. Until this occurs, the program loops through line 564. When the saw 50 has completed its traverse, the yes line 566 directs the program to block 568 for the purpose of commanding the saw to move up and to retract, and the program proceeds through line 570 and point 5 to line 692 in FIG. 7 where the step indicated in block 694 of incrementing the address counter for saw x is performed to reach the next instruction at that address.

The program proceeds through line 696 to block 698 to check whether the program identification switch 88 remains on the same program as before. If there is no change, the program proceeds through line 702 to block 704 to test whether there has been an overflow in the address selection. If the program should have exceeded the maximum number of addresses available at this point, the program proceeds down line 708 to the block 710 to activate the overflow light and the program branches through line 712 and point 10 to the point 10 at the top of FIG. 6 and the start line 508 of the automatic program sequence.

Reverting back to block 704, if there has been no address overflow, the program proceeds through line 706 and point 9 to line 518 as indicated at the upper left of FIG. 6. Reverting to block 698, if there has been a change in the program identification switch 88, the program proceeds through line 700 to point 10 at the top of FIG. 6.

Referring now back to block 532 in FIG. 6, if the test of the feed inhibit on y channel is negative, the program proceeds via line 534 to block 572. This indicates that neither the x or the y channel is inhibited. This enables commands to be executed simultaneously in both the x and the y channels at the present x and y addresses. The program then proceeds through line 574 to block 576 to test whether either the x or y feed carriage positions have been achieved. If this test is negative, the program moves through line 578 to point 6 at the top of FIG. 7 and through line 680 to the block 682. At this point a test is made as to whether more than enough time has elapsed to achieve the feed position. If this preset amount of time has elapsed indicating that the feed carriage is overdue, the program proceeds through line 686 to block 688 for the purpose of activating the fault light 100, and then proceeds via line 690 and point 4 to the original start point at line 252 at the top of FIG. 4. If, on the other hand the feed carriage is not overdue, the program proceeds via line 684 and point 9 to the upper left of FIG. 6 and line 518.

Reverting to block 576, if the test there indicates that either the x or the y position has been achieved by the respective feed carriage, the program proceeds via line 580 to block 582. If, for example the test indicates a yes for the x axis, the test is made as indicated at block 582 to determine whether the saw in x axis is in the up and retracted position. Until this has been achieved, the program waits via loop 584. When the saw 50 is in the up and retracted position, the program proceeds via line 586 to block 588 to execute a command for the saw to proceed down and to cut. The program then proceeds down line 590 to block 592 to test whether the carriage in the y axis has achieved its terminal position for this step. Until this is achieved, the program closes back via no line 594 and point 9 to the line 518.

When the carriage has reached the desired position for the y axis, the program proceeds via line 596 to block 598 to check whether the saw 52 is in its up and retracted position. Until this position is achieved, the program holds via loop 600. With the saw 52 in its up and retracted position, the program proceeds via line 602 and point 7 to the upper right portion of FIG. 6 and block 604, where the y channel saw is commanded to move down and to cut. The program then proceeds via line 606 to the block 608 for a test of whether either the x or the y cuts, which are now being performed, have been completed. Until one or the other is completed, the program holds at this point via the no loop 610.

As soon as either cut has been completed and assuming the the x cut completes first, the program proceeds via line 612 to block 614 where the address counter for the x channel is incremented one step to the next instruction. The program proceeds via line 616 to block 618 for checking whether the program identification has been changed. If it has been changed, the program proceeds via line 620 to the line 508 which returns the control to the start switch. If the program identification had not been changed at this point, the program proceeds via line 622 to block 624 for a test of whether there has been an overflow in the counter for the address selected. If the test is yes, the program returns via line 626 and block 627 to activate the overflow light and to return control to the start switch at block 510. Lacking any overflow, the program proceeds via line 628 to the line 518.

Reverting to block 526, if the feed inhibit test for the x channel had come up positive, the program proceeds via line 528 and point 8 to the upper left of FIG. 7 where it proceeds via line 640 to block 642 to test whether there is a feed inhibit in the y channel. If this test is positive, the program proceeds via line 648 to line 680 and block 682 to again go through the procedure for the carriage being overdue. A negative result at block 642 indicates that the y channel is not inhibited, although the x channel is, and the program proceeds via line 646 to block 650 for the purpose of commanding execution of the feed instruction at the current y address and causing the y carriage to proceed.

The program proceeds via line 652 to block 654 to test the achievement of the indicated feed carriage position. Until this has been achieved, the program holds via no line 656 and point 6 to the line 680. As soon as the y carriage has reached the end of its stroke for this step, the program proceeds via line 658 to the block 660 for the purpose of commanding the y saw to proceed down and to cut. The program then proceeds via line 662 to block 664 awaiting the completion of the cut, and until this has been completed, the program pauses via loop 666. When the cut is complete, the program proceeds via line 668 to block 670 for the purpose of commanding the y channel saw 52 to proceed up and to return to its starting position. The program proceeds further via line 672 to block 673 to increment the y channel saw address counter and thence via line 675 to the line 616 on FIG. 6. The program then proceeds as previously described to initiate another step in the x axis.

What is claimed is:

1. A machine tool having a first carriage and a feed mechanism therefor movable in a direction X, a second carriage and a feed mechanism therefor movable in a direction Y, tool operating means for performing tooling operations in sequence on work pieces carried by the carriages at points on said work pieces which are determined by the travel of the feed mechanisms, servo motors for driving the feed mechanisms, feed-back transducers for signaling the travel of the feed mechanisms, a digital command sequence controller having a memory core for receiving, storing, and transmitting digital data corresponding to any desired travel increments of the carriages and for receiving, storing and transmitting digital data corresponding to any desired sequence of tooling operations, a manually operated electrical keyboard selectively connectable with the core for inserting digital data therein in individual blocks, each block corresponding to a desired dimensional increment between two points of travel of a carriage, logic units connecting the keyboard with the core to control the insertion of data into the core, and selector means for conditioning the logic units either to control the insertion of dimensional data into the memory core or to control the transmission of data stored in the memory core to the servo motors to produce a sequence of carriage feed movements corresponding to the blocks of dimensional data produced by the electrical keyboard.

2. A machine tool according to claim 1 and further comprising a digital display means connected to said keyboard to indicate directly and in readable form the dimensional data of each block as it is generated by the operation of the keyboard.

3. A machine tool according to claim 2 wherein an additional digital display means is connected with the keyboard to indicate in readable form whichever steps in a sequence of steps each block of data displayed by the digital display means corresponds to.

4. A machine tool including a control system for controlling the position of a work piece relative to a machine tool cutting element associated therewith and the cutting operation of said element in accordance with a program of preselected individual commands sequentially recalled from a memory to actuate said machine tool, said system comprising: an electrical keyboard including an output terminal, said keyboard adapted to be manually operated by an operator such that individual commands comprising dimensional representative electrical data signals can be entered into the system from said keyboard output terminal, said data signals uniquely identifying the dimensional information of each of said commands; display means for displaying said data signals as a readable dimension as said data signal appears at said output terminal of said keyboard; a core memory adapted to receive and store a plurality of said data signals in a sequence which forms a program of instructions for operating said machine tool in a sequential, preselected manner; means for selectively coupling said keyboard output to said memory thereby inserting said data from said keyboard output into said memory; drive means on said machine tool for positioning said work piece relative to said cutting element; control means for recalling individual commands from said memory and applying said data from said memory to said drive means such that for each data signal recalled from said memory, said drive means locates said work piece at a predetermined position relative to said cutting element, said predetermined position corresponding to a dimension represented by said data signals; actuating means for actuating said cutting element to cut said work piece at said predetermined location; said memory and control means adapted to allow any one of a plurality of predetermined programs each comprising a plurality of sequential instructions in the form of dimensional representative electrical data signals to be recalled from said memory to actuate said machine tool in a predetermined manner to perform a plurality of operations on said work piece.

5. A system as defined in claim 4 and further comprising a stop coupled to said drive means and movable toward and away from said cutting element, said stop coupled to said drive means such that each dimensional representative data signal causes said stop to move until the distance between said stop and said cutting element corresponds to the dimension represented by said data signal.

6. A system as defined in claim 4 whereby said cutting element comprises a rotary saw.

7. A saw for cutting panel-like workpieces into smaller panels having any one of a number of preselected dimensions comprising: a first cutting mechanism including a platen, a cutter, and a drive mechanism for producing a relative cutting motion between said platen and said cutter in a first direction, a feed mechanism for feeding a work piece along the platen in a second direction perpendicular to said first direction, a second cutting mechanism including corresponding drive and feed mechanisms operative in said second and first directions respectively, a control circuit including a core memory for receiving, storing and transmitting data in digital form corresponding to starting and stopping points and operation sequences for the two drive mechanisms and the two feed mechanisms, an electrical keyboard for generating electrical data signals, said keyboard selectively coupled to said core for inserting said data therein; servo motor means for operating each of said drive and feed mechanisms, feed-back means responsive to the operation of said servo motors, means coupled to said feed-back means and to said memory core for comparing the data therefrom with the output of said feed-back means, said comparing means having an output coupled to said servomotor to control said servo motor, and a logic unit providing separately selective logic sequences for conditioning the machine to operate either in a mode for inserting into said memory core data corresponding to a desired sequence of cuts in the first and second directions at selected spacings, or in the mode of command to perform a sequence of cuts corresponding to any one of a number of sequences determined by data stored in said core memory.

8. The saw of claim 7 and further including display means coupled to said electrical keyboard for displaying the data signals generated thereby to provide a visual accuracy check of said data signals as they appear at an output of said keyboard.

References Cited
UNITED STATES PATENTS

| | | | |
|---|---|---|---|
| 3,508,251 | 4/1970 | Kelling | 235—151.11 |
| 3,024,610 | 3/1962 | Ulman | 340—147 PR |
| 2,952,500 | 9/1960 | Trechsel | 235—151.11 |
| 3,519,807 | 7/1970 | Jacques et al. | 235—151.11 |
| 3,074,632 | 1/1963 | Braun et al. | 340—147 PR |
| 3,324,364 | 6/1967 | Caruthers | 340—147 PR |
| 3,226,677 | 12/1965 | Forrester | 340—147 P |
| 3,274,553 | 9/1966 | Oya | 340—147 P |
| 3,553,647 | 1/1971 | Bullock | 340—147 MT |
| 3,543,289 | 7/1971 | Lerch | 340—147 P |

HAROLD I. PITTS, Primary Examiner

U.S. Cl. X.R.

340—147 R